United States Patent
Kang et al.

(10) Patent No.: US 8,569,954 B2
(45) Date of Patent: Oct. 29, 2013

(54) LUMINESCENCE DRIVING APPARATUS, DISPLAY APPARATUS, AND DRIVING METHOD THEREOF

(75) Inventors: Jeong-il Kang, Yongin-si (KR);
Gil-yong Chang, Suwon-si (KR);
Young-deok Choi, Seoul (KR);
Hyo-soon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 13/053,754

(22) Filed: Mar. 22, 2011

(65) Prior Publication Data
US 2012/0049740 A1 Mar. 1, 2012

(30) Foreign Application Priority Data
Aug. 30, 2010 (KR) .................. 10-2010-0084115

(51) Int. Cl.
*H05B 39/10* (2006.01)

(52) U.S. Cl.
USPC .............................. 315/91; 315/291

(58) Field of Classification Search
USPC .................... 315/91, 291, 297, 307
See application file for complete search history.

(56) References Cited

U.S. PATENT DOCUMENTS

| | | | | |
|---|---|---|---|---|
| 7,372,217 B2* | 5/2008 | Tsai et al. | | 315/308 |
| 2002/0175640 A1* | 11/2002 | Kim et al. | | 315/307 |
| 2008/0266740 A1* | 10/2008 | Smith | | 361/91.5 |
| 2009/0302776 A1* | 12/2009 | Szczeszynski | | 315/246 |
| 2010/0259191 A1* | 10/2010 | Ghanem et al. | | 315/297 |
| 2011/0169426 A1* | 7/2011 | Sadwick et al. | | 315/307 |

* cited by examiner

*Primary Examiner* — Jason M Crawford
(74) *Attorney, Agent, or Firm* — Sughrue Mion, PLLC

(57) ABSTRACT

A luminescence driving apparatus, a display apparatus, and a driving method thereof are provided. The luminescence driving apparatus drives a plurality of light-emitting units and includes: a voltage sensor which senses internal voltages of the plurality of light-emitting units; a current sensor which senses internal currents of the plurality of light-emitting units; a sensing signal generator which receives the internal voltages of the plurality of light-emitting units from the voltage sensor to generate an overvoltage sensing signal; a controller which, if it is determined that an overvoltage state has occurred, according to a level of the overvoltage sensing signal, searches for at least one of the plurality of light-emitting units in which the overvoltage state has occurred, according to levels of the internal currents sensed by the current sensor; and a protector which performs an overvoltage protection (OVP) operation with respect to the searched light-emitting unit.

20 Claims, 11 Drawing Sheets

LUMINESCENCE DRIVING APPARATUS, DISPLAY APPARATUS, AND DRIVING METHOD THEREOF

CROSS-REFERENCE TO RELATED APPLICATION

This application claims priority from Korean Patent Application No. 10-2010-0084115, filed on Aug. 30, 2010, in the Korean Intellectual Property Office, the disclosure of which is incorporated herein by reference in its entirety.

BACKGROUND

1. Field

Methods and apparatuses consistent with the exemplary embodiments relate to a luminescence driving apparatus, a display apparatus, and a driving method thereof, and more particularly, to a luminescence driving apparatus which can perform an overvoltage protection (OVP) function with respect to each channel, and a display apparatus, and a driving method thereof.

2. Description of the Related Art

With the development of slimmer display devices, an edge-lit type light-emitting diode back light unit (LED BLU) has been actively developed. Since driving a plurality of LEDs, which are connected to one another in series, using one driving circuit is economical, it is advantageous for the edge-lit type LED BLU to use a switching type circuit as shown in FIG. 1A.

FIG. 1A is a circuit diagram illustrating a related art LED driving integrated circuit (IC) using a boost circuit method.

Only several major pins of the LED driving IC are shown in FIG. 1A. The LED driving IC of FIG. 1A feeds a current flowing in an LED back thereto through a resistor Rs, compares the current with a reference current Iref corresponding to a current command, adjusts a switching duty of a first modulator M1 according to the comparison result, and controls the LED so that a voltage sensed by the resistor Rs accurately tracks the reference current Iref and thus a desired current flows in the LED. The most important problem of such a boost type circuit is that an output voltage infinitely increases if the LED is opened. Therefore, if a voltage sensed by an overvoltage protection (OVP) pin reaches a specific voltage, a latch type or auto-recovery type protection operates to turn off the first modulator M1 or both of the first modulator M1 and a second modulator M2.

FIG. 1B is a block diagram illustrating the related art LED driving IC of FIG. 1A.

An LED arranged above a BLU and an LED arranged under the BLU must be independently driven in a television (TV) or similar devices which support a 3-dimensional (3-D) mode. Therefore, two or more driving circuits are required. In this case, a system is constituted by repeatedly using a structure as shown in FIG. 1A.

FIG. 1C is a circuit diagram illustrating a related art driving system for driving a plurality of LED arrays.

Referring to FIG. 1C, OVP processing blocks of circuits are independently constituted and thus are arranged by the number of circuits. Therefore, the number of OVP pins which receive signals from the OVP processing blocks are too numerous.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a luminescence driving apparatus which can simplify a structure of a light-emitting diode (LED) driving chip, a display apparatus, and a driving method thereof.

According to an aspect of an exemplary embodiment, there is provided a luminescence driving apparatus which drives a plurality of light-emitting units. The luminescence driving apparatus may include: a voltage sensor which senses internal voltages of the plurality of light-emitting units; a current sensor which senses internal currents of the plurality of light-emitting units; a sensing signal generator which receives the internal voltages of the plurality of light-emitting units from the voltage sensor to generate an overvoltage sensing signal; a controller which, if it is determined that an overvoltage state has occurred, according to a level of the overvoltage sensing signal, searches for at least one of the plurality of light-emitting units in which the overvoltage state has occurred, according to levels of the internal currents sensed by the current sensor; and a protector which performs an overvoltage protection (OVP) operation with respect to the searched light-emitting unit.

The plurality of light-emitting units may be light-emitting diode (LED) arrays which are arranged at an edge part of a backlight unit (BLU). The sensing signal generator may include at least one diode path which receives the internal voltages of the plurality of light-emitting units and performs diode OR-ING with respect to the internal voltages to output the overvoltage sensing signal.

If the overvoltage sensing signal is higher than or equal to a preset first threshold value, the controller may determine that the overvoltage state has occurred, compare the levels of the internal currents sensed by the current sensor with a reference current, and determine one of the plurality of light-emitting units from which the internal current having the level less than the reference current has been sensed, as the light-emitting unit in which the overvoltage state has occurred.

If the overvoltage sensing signal is higher than or equal to a preset second threshold value, the controller may control the protector to perform an OVP operation with respect to all of the plurality of light-emitting units.

The OVP operation may be an operation of switching off a switch which is connected to the plurality of light-emitting units to apply power to the plurality of light-emitting units.

The luminescence driving apparatus may be realized as a boost type integrated circuit (IC).

According to an aspect of another exemplary embodiment, there is provided a display apparatus. The display apparatus may include: a plurality of LED arrays; a voltage sensor which senses internal voltages of the plurality of LED arrays; a current sensor which senses internal currents of the plurality of LED arrays; and a controller which, if it is determined that an overvoltage state has occurred, uses an overvoltage determination signal corresponding to the internal voltages sensed by the voltage sensor, checks at least one of the plurality of LED arrays in which the overvoltage state has occurred, according to levels of the internal currents sensed by the current sensor and performs an OVP operation with respect to the at least one LED array.

If the overvoltage determination signal is higher than or equal to a preset first threshold value, the controller may determine that the overvoltage state has occurred, compare the levels of the internal currents sensed by the current sensor with a reference current, determine one of the plurality of LED arrays from which the internal current having the level less than the reference current has been sensed, as the at least one LED array in which the overvoltage state has occurred, and perform an OVP operation with respect to the at least one LED array.

If the overvoltage determination signal is higher than or equal to a preset second threshold value, the controller may perform an OVP operation with respect to all of the plurality of LED arrays.

The display apparatus may be a 3-dimensional (3D) image display apparatus which includes an edge-lit type LED backlight unit (BLU).

According to an aspect of another exemplary embodiment, there is provided a luminescence driving method of driving a plurality of light-emitting units. The luminescence driving method may include: determining whether an overvoltage state has occurred, using internal voltages of the plurality of light-emitting units; if it is determined that the overvoltage state has occurred, searching for one of the plurality of light-emitting units in which the overvoltage state has occurred, using internal currents of the plurality of light-emitting units; and performing an OVP operation with respect to the searched light-emitting unit.

The determining whether the overvoltage state has occurred may include: sensing the internal voltages from the plurality of light-emitting units; performing diode OR-ING with respect to the sensed internal voltages to generate an overvoltage sensing signal; and if the overvoltage sensing signal is higher than or equal to a preset first threshold value, determining that the overvoltage state has occurred.

The luminescence driving method may further include: if the overvoltage sensing signal is higher than or equal to a preset second threshold value, performing an OVP operation with respect to all of the plurality of light-emitting units.

The plurality of light-emitting units may be LED arrays which are arranged at an edge part of a BLU.

The OVP operation may be an operation of switching off a switch which is connected to the plurality of light-emitting units to apply power to the plurality of light-emitting units.

According to an aspect of another exemplary embodiment, there is provided a method of driving a display apparatus including a plurality of LED arrays. The method may include: determining whether an overvoltage state has occurred, using an overvoltage determination signal corresponding to internal voltages of the plurality of LED arrays; and if it is determined that the overvoltage state has occurred, checking at least one of the plurality of LED arrays in which the overvoltage state has occurred, according to levels of internal currents of the plurality of LED arrays and performing an OVP operation with respect to the at least one LED array.

The determining whether the overvoltage state has occurred may include: sensing the internal voltages from the plurality of LED arrays; performing diode OR-ING with respect to the sensed internal currents to generate the overvoltage determination signal; and if the overvoltage determination signal is higher than or equal to a preset first threshold value, determining that the overvoltage state has occurred.

The method may further include: if the overvoltage determination signal is higher than or equal to a preset second threshold value, performing an OVP operation with respect to all of the plurality of LED arrays.

The performance of the OVP operation may include: sensing the internal currents from the plurality of LED arrays; comparing levels of the sensed internal currents with a reference current; and determining one of the plurality of LED arrays from which an internal current having a level that is less than the reference current has been sensed, as the at least one LED array in which the overvoltage state has occurred and performing an OVP operation with respect to the at least one LED array.

The display apparatus may be a 3D image display apparatus which comprises an edge-lit type LED BLU.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1A:
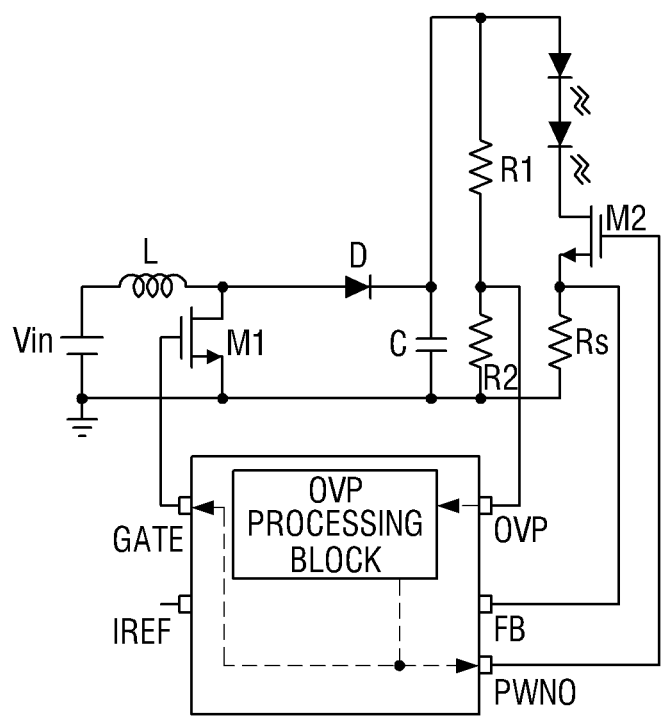
FIGS. 1A through 1C are views illustrating a structure of a related art light-emitting diode (LED) driving integrated circuit (IC)
Figure 1B:
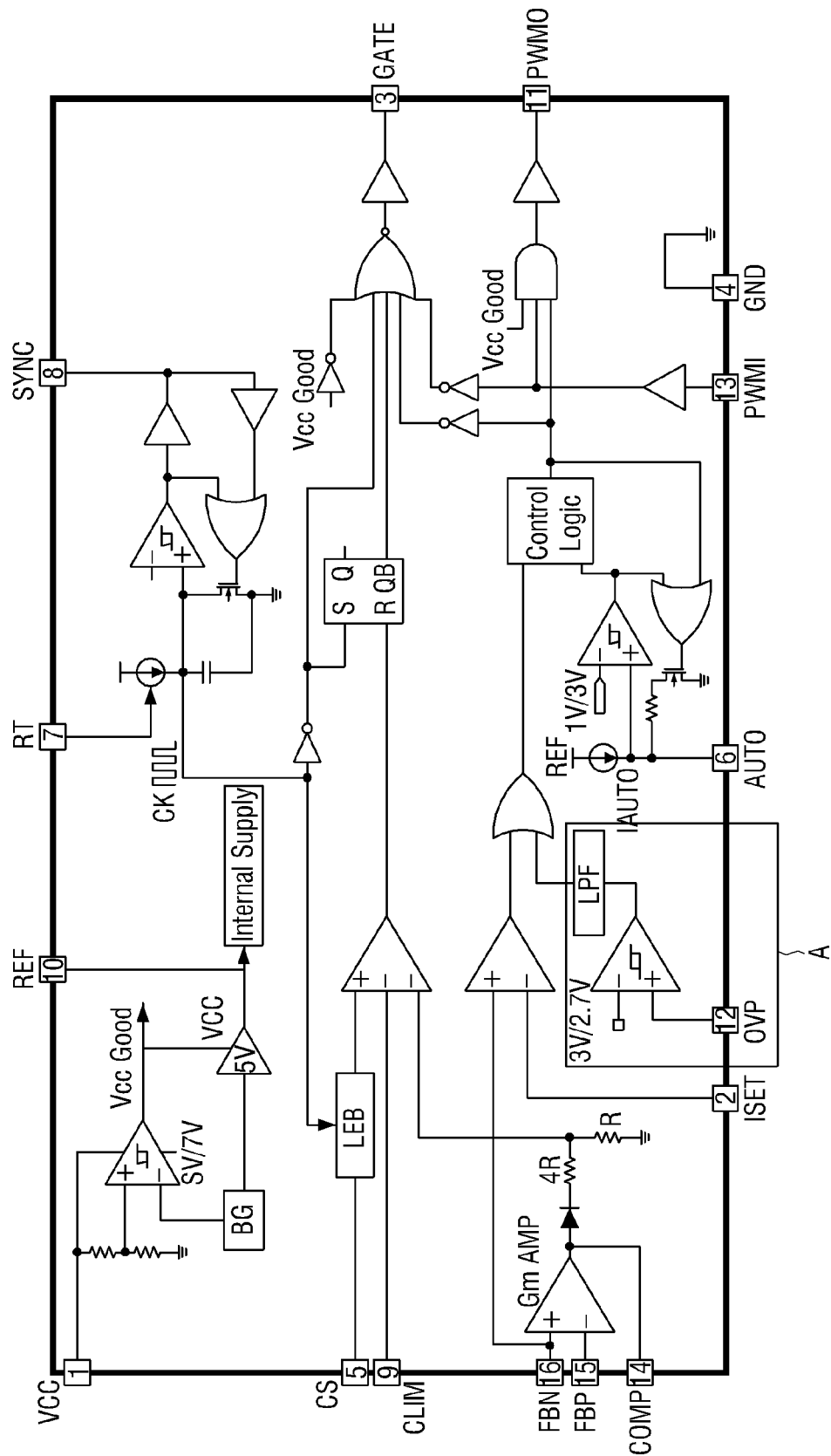
Figure 1C:
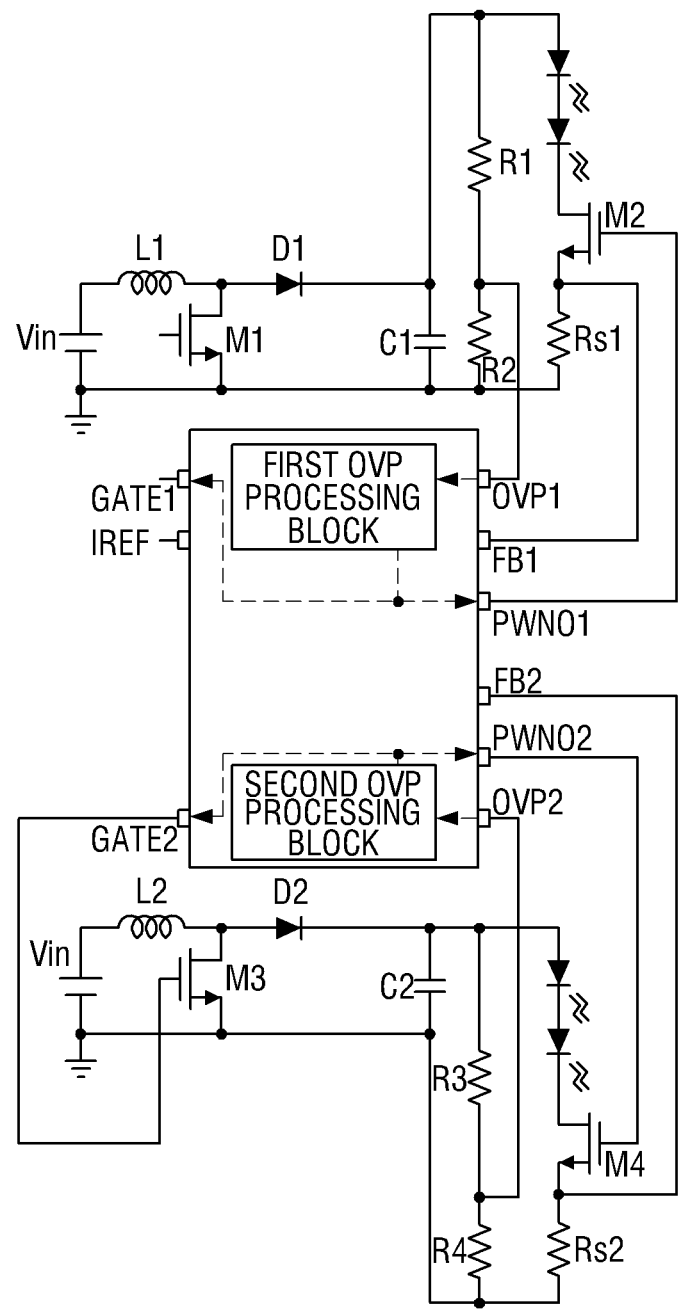

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
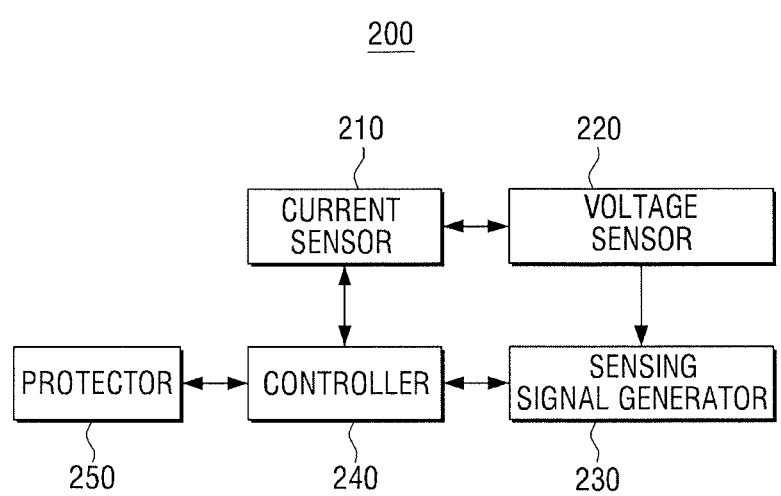
FIG. 2 is a block diagram illustrating a structure of a luminescence driving apparatus according to an exemplary embodiment.

FIG. 2 is a block diagram illustrating a structure of a luminescence driving apparatus 200 according to an exemplary embodiment.

Referring to FIG. 2, the luminescence driving apparatus 200 includes a current sensor 210, a voltage sensor 220, a sensing signal generator 230, a controller 240, and a protector 250.

The luminescence driving apparatus 200 drives a plurality of light-emitting units (not shown) and may be realized as a boost type integrated circuit (IC).

Here, the plurality of light-emitting units may be realized as light-emitting diode (LED) arrays which are arranged at an edge part of a back light unit (BLU). For example, the plurality of light-emitting units may be applied to a driving circuit of an edge-lit type LED BLU. In the edge-lit type LED BLU, the LED arrays are installed only at a side edge of the edge-lit type LED BLU to emit light onto a center of a panel. Detailed descriptions of this will be omitted.

The voltage sensor 220 senses internal voltages of the plurality of light-emitting units. Here, the voltage sensor 220 may be realized in a structure in which two voltage divider resistors R1 and R2 or R3 are connected to each of the plurality of light-emitting units and are connected to one another in series. In other words, voltage sensors 220 may be arranged by the number of the plurality of light-emitting units.

For example, if two light-emitting units, i.e., two LED arrays, are arranged, two voltage sensors 220 may be arranged, and each of the two voltage sensors 220 may be realized in a structure in which two voltage divider resistors R1 and R2 are connected to each other in series.

Voltage values sensed by the voltage sensor 220 may be voltages which are divided according to resistance values of resistors which are connected to each other in series. In other words, a voltage between the voltage divider resistors R1 and R2 may be sensed by the voltage sensor 220 and then input into the controller 240.

The current sensor 210 senses internal currents of the plurality of light-emitting units. Here, the current sensor 210 may be realized as a resistor Rs which is connected to each of the plurality of light-emitting units. In other words, current sensors 210 may be arranged according to the number of the plurality of light-emitting units.

For example, if two light-emitting units, i.e., two LED arrays, are arranged, two current sensors 210 may be arranged, and each of the two current sensors 210 may be realized as one of resistors Rs1 and Rs2.

The sensing signal generator 230 receives the internal voltages of the plurality of light-emitting units from the voltage sensor 220 to generate an overvoltage sensing signal.

The sensing signal generator 230 may include at least one diode path which receives the internal voltages of the plurality of light-emitting units and performs diode OR-ING with respect to the internal voltages to output the overvoltage sensing signal. Here, the diode OR-ING may be realized as an OR logic gate which combines two signals and causes an output to be turned on if the two signals exist. In other words, the diode OR-ING includes two inputs and one output, and if only one of the two inputs is on a high level, the output is on a high level.

For example, if only one of the internal voltages of the plurality of light-emitting units is OVP, an OVP signal may be output.

If the controller 240 determines that an overvoltage state has occurred, according to a level of the overvoltage sensing signal generated by the sensing signal generator 230, the controller 240 searches for at least one of the plurality of light-emitting units in which the overvoltage state has occurred, according to levels of the internal currents sensed by the current sensor 210.

If the overvoltage sensing signal generated by the sensing signal generator 230 is higher than or equal to a preset first threshold value, the controller 240 determines that the overvoltage state has occurred. The controller then compares the levels of the internal currents sensed by the current sensor 210 with a reference current, and determines that one of the plurality of light-emitting units from which the internal current having a level that is less than the reference current has been sensed, as the light-emitting unit in which the overvoltage state has occurred.

If the sensing signal generated by the sensing signal generator 230 is higher than or equal to a preset second threshold value, the controller 240 controls the protector 250 to perform an OVP operation with respect to all of the plurality of light-emitting units.

The protector 250 performs an OVP operation with respect to the determined light-emitting unit.

In the exemplary embodiments, an OVP operation may be an operation of shutting down an output if an output voltage becomes higher or equal to a predetermined voltage value. For example, the OVP may be an operation of switching off a switch which is connected to the light-emitting units to apply power to the light-emitting units.

In the above-described exemplary embodiment, an OVP function has been described, but a protection function, such as overcurrent protection (OCP), overload protection (OLP), overtemperature protection (OTP), short-circuit protection (SCP), or the like, may be additionally applied to the luminescence driving apparatus 200.

Figure 3:
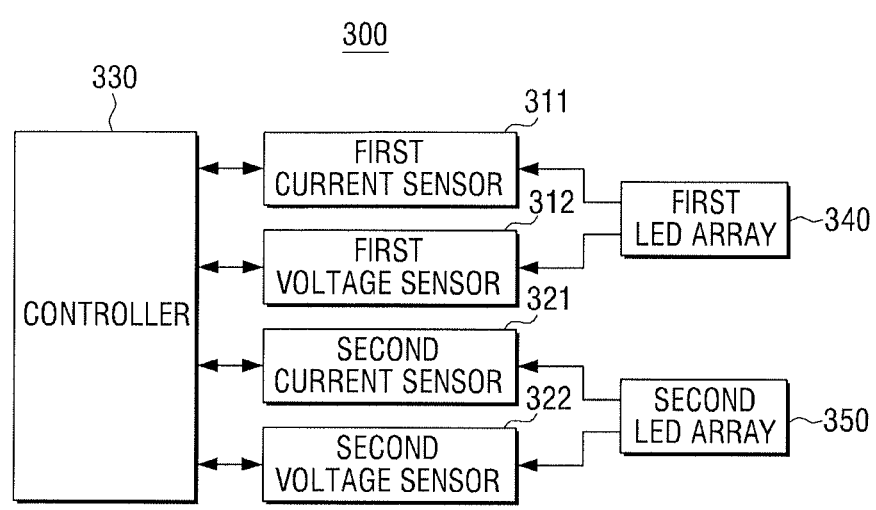
FIG. 3 is a block diagram illustrating a structure of a display apparatus according to an exemplary embodiment.

FIG. 3 is a block diagram illustrating a structure of a display apparatus 300 according to an exemplary embodiment.

Referring to FIG. 3, the display apparatus 300 includes a plurality of LED arrays, i.e., first and second LED arrays 340 and 350, first and second voltage sensors 312 and 322, first and second current sensors 311 and 321, and a controller 330. In the present exemplary embodiment, for convenience of explanation, the plurality of LED arrays 340 and 350, i.e., two LED channels, are arranged. However, this is merely an exemplary embodiment, and thus the same principle may be applied even when the display apparatus 300 includes three or more LED arrays.

The display apparatus 300 may be realized as a 3-dimensional (3D) image display apparatus which includes an edge-lit type LED BLU, in detail, as a liquid crystal display (LCD) 3D TV.

In general, a LCD TV cannot self-emit light and thus includes an LED BLU which projects backlight onto an LCD panel. The LED BLU may include a backlight driving circuit and a light-emitting module.

The display apparatus 300 may include an LCD panel (not shown) which adjusts transmissivity of light generated by the LED BLU to visualize an image signal and displays the image signal on a screen.

The display apparatus 300 may further include an image input unit (not shown) and an image processor (not shown).

The image input unit includes a plurality of input terminals, receives a component image signal, a super-video home system (S-VHS) image signal, a composite image signal, and the like from an external device, such as a video player or a digital video disc (DVD) player, through the plurality of input terminals, and receives acoustic signals of the component image signal, the S-VHS image signal, and the composite image signal through the plurality of input terminals.

The image processor performs signal processing, such as video decoding, video scaling, frame rate conversion (FRC), or the like, with respect to an image signal or broadcasting contents input from the image input unit. The image processor converts an input image into an image signal so that the image signal has a form suitable for the LCD panel and generates a brightness control signal of the BLU.

A structure of a backlight driving circuit of an LED BLU to which the present inventive concept is applied will now be described.

The first voltage sensor 312 senses an internal voltage of the first LED array 340. For example, the first voltage sensor 312 may be realized to sense an internal voltage of an LED array which is arranged above an LED BLU of a 3D image display apparatus.

The second voltage sensor 322 senses an internal voltage of the second LED array 350. For example, the second voltage sensor 322 may be realized to sense an internal voltage of an LED array which is arranged under the LED BLU of the 3D image display apparatus.

The first current sensor 311 senses an internal current of the first LED array 340.

The second current sensor 321 senses an internal current of the second LED array 350.

The controller 330 determines whether an overvoltage state has occurred, by using an overvoltage determination signal corresponding to the internal voltages sensed by at least one of the first and second voltage sensors 312 and 322.

If the controller 330 determines that the overvoltage state has occurred, the controller 330 checks at least one of the first and second LED arrays 340 and 350 in which the overvoltage state has occurred, according to levels of the internal currents sensed by the first and second current sensors 311 and 321 and performs an OVP operation with respect to the at least one LED array.

If the overvoltage determination signal is higher than or equal to a preset first threshold voltage, the controller 330 determines that the overvoltage state has occurred, compares the levels of the internal currents sensed by the first and second current sensors 311 and 321 with a reference current, determines one of the first and second LED arrays 340 and 350 from which the internal current having a level less than the reference current has been sensed, as the at least one LED array in which the overvoltage state has occurred, and performs an OVP operation with respect to the at least one LED array. Here, the reference current may have a value which is lower than a reference current Iref that is a standard of a pulse width modulation (PWM) control. For example, the reference current may have a value of 0.8*Iref.

If the overvoltage determination signal is higher than or equal to a preset second threshold value, the controller 330 performs an OVP operation with respect to all of the plurality of LED arrays. Here, the preset second threshold value may be set to be greater than the preset first threshold value and may be preset by a manufacturer or may be changed by a user.

Figure 4:
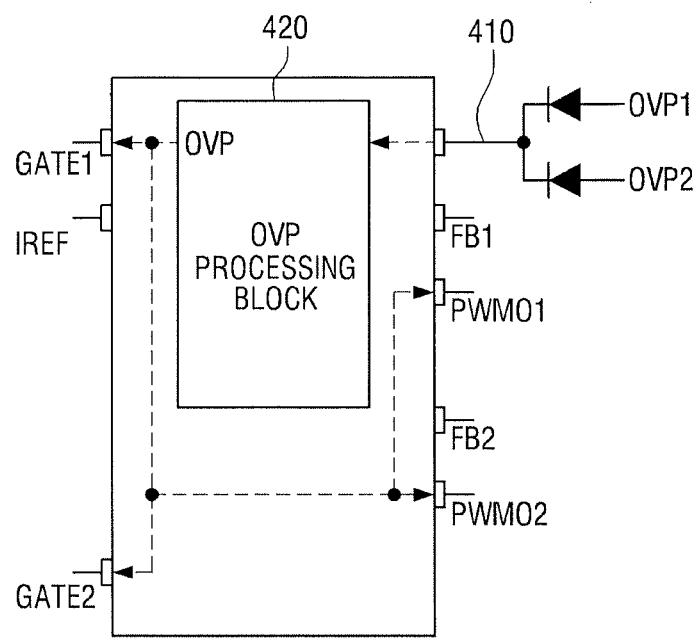
FIG. 4 is a circuit diagram illustrating a structure of a diode OR-ING according to an exemplary embodiment.

FIG. 4 is a circuit diagram illustrating a structure of a diode OR-ING according to an exemplary embodiment.

As shown in FIG. 4, diode OR-ING is performed with respect to OVP signals, and then the OVP signals are input into an IC. In more detail, 2 or more independent circuits may be driven using an IC having a 2-in-1 or n-in-1 structure.

Therefore, the number of OVP input pins, such as OVP1 and OVP2, which are used by the number of channels may be reduced in an LED driving IC. However, in this case, it is impossible to distinguish whether an OVP has occurred in which channel, and thus a protection is performed with respect to all of the channels.

Figure 5:
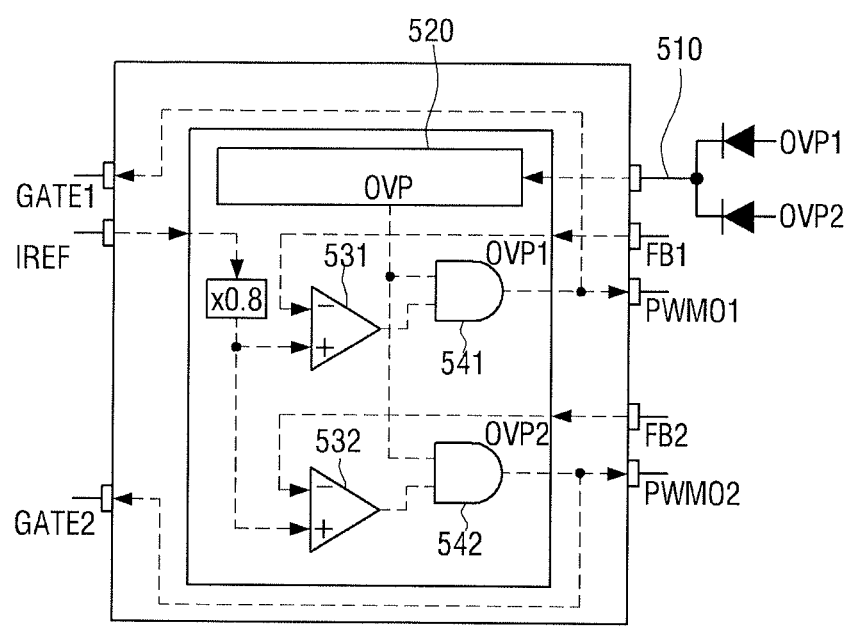
FIG. 5 is a circuit diagram illustrating a structure of an overvoltage protection (OVP) processing block according to an exemplary embodiment.

FIG. 5 is a circuit diagram illustrating a structure of an OVP processing block 520 according to an exemplary embodiment.

As shown in FIG. 5, the OVP processing block 520 may use all of first and second feedback currents FB1 and FB2 sensed from LED channels (i.e., LED arrays) and a reference current Iref.

In more detail, if a signal 510 on which diode OR-ING has been performed is detected to be higher than or equal to a preset threshold value, the OVP processing block 520 may detect an overvoltage channel using the first and second feedback currents FB1 and FB2 of the LED channels sensed by a current sensor (not shown) and the reference current Iref.

For example, the OVP processing block 520 compares the first and second feedback currents FB1 and FB2 of the LED channels with a value obtained from Iref*0.8, determines that an LED of the LED channel having a current lower than the value of Iref*0.8 is opened or a voltage Vf of the LED is excessively high, and disables outputs of first and second gates GATE1 and GATE2 and outputs of first and second pulse width modulators (PMWs) PMW01 and PMW02 so as to perform an OVP operation with respect to the LED channel.

The OVP processing block 520 determines that the LED channel having a current higher than the value of Iref*0.8 normally operates so as not to perform an OVP operation with respect to the LED channel.

In more detail, a case where an LED of a channel is opened will now be exemplarily described. An LED driving IC does not have a current sensed by a feedback (FB) pin and thus continuously drives a gate at a higher duty to increase an output voltage. Therefore, if the output voltage reaches a specific voltage, the OVP processing block 520 operates.

In this case, since a current does not continuously flow in the FB pin, an output which has been compared with 0.8*Iref becomes high. Therefore, the first and second PWMs PWM01 and PWM02 and the first and second gates GATE1 and GATE2 are disabled.

Since an output of the LED channel in which a normal current flows is compared with 0.8*Iref and then becomes low, the outputs of the first and second PWMs PWM01 and PWM02 and the first and second gates GATE1 and GATE2 are enabled regardless of an output of the OVP processing block 520.

The structure of the OVP processing block 520 will now be described in more detail. The signal 510 on which diode OR-ING has been performed is compared with a preset threshold value in the OVP processing block 520 to determine whether the signal 510 is in an overvoltage state. In other words, the OVP processing block 520 may include a comparator (not shown) which compares the signal 510 with a preset voltage threshold value.

If it is determined that the overvoltage state has occurred, according to the comparison result between the signal 510 and the preset threshold value, i.e., a high signal (e.g., 1) is output, comparators 531 and 532 respectively compare the first and second feedback currents FB1 and FB2 sensed from the LED channels with a current threshold value of 0.8*Iref. Here, hysteresis comparators may be used as the comparators 531 and 532.

If each of the first and second feedback currents FB1 and FB2 is lower than the current threshold value of 0.8*Iref, the comparators 531 and 532 respectively output high signals (e.g., 1). If each of the first and second feedback currents FB1 and FB2 is higher than the current threshold value of 0.8*Iref, the comparators 531 and 532 respectively output low signals (e.g., 0).

Outputs of the comparators 531 and 532 and a high signal (e.g., 1) output from the OVP processing block 520 go through AND operations in AND circuits 541 and 542 and are then output.

For example, if a high signal (e.g., 1) is output from the comparator 531, and a low signal (e.g., 0) is output from the comparator 532, the high and low signals of the comparators 531 and 532 and the high signal (e.g., 1) of the OVP processing block 520 go through AND operations and are then output. Therefore, the AND circuit 541 outputs a high signal (e.g., 1), and the AND circuit 542 outputs a low signal (e.g., 0).

Accordingly, the OVP processing block 520 determines that an overvoltage state has occurred in the LED channel corresponding to the first feedback current FB1 and then performs an OVP operation with respect to the corresponding LED channel. In other words, the first and second PWMs PWM01 and PWM02 and the first and second gates GATE1 and GATE2 are disabled by the high signal of the AND circuit 541.

In the preset exemplary embodiment, gain of 0.8 is merely an exemplary embodiment and thus may have any value which is optimized according to the surrounding conditions.

Figure 6:
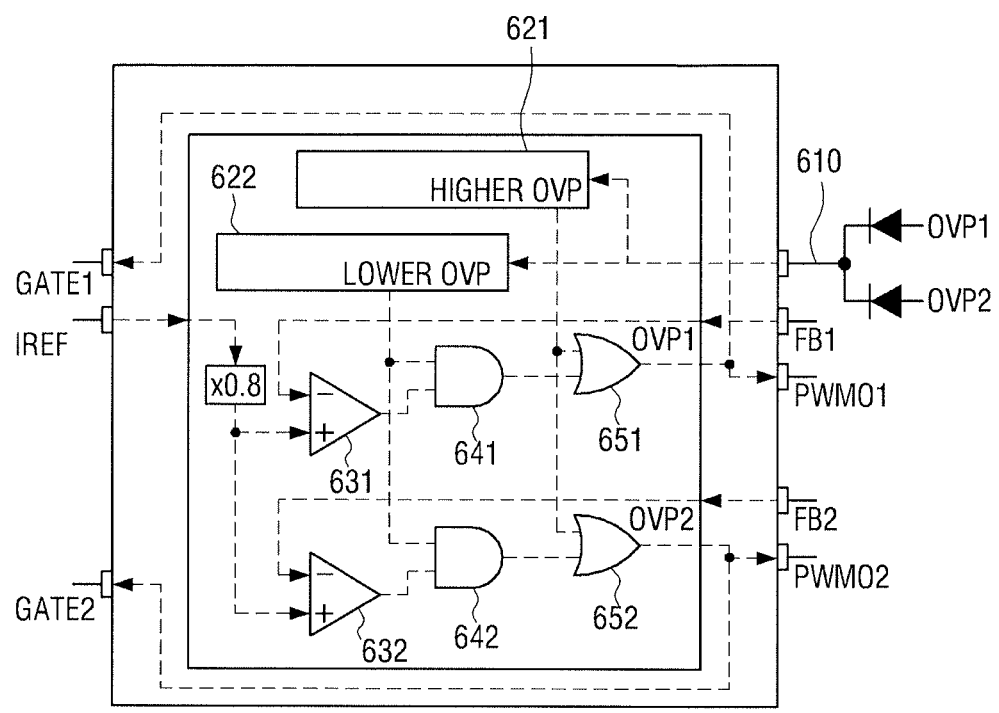
FIG. 6 is a circuit diagram illustrating a structure of an OVP processing block according to another exemplary embodiment.

FIG. 6 is a circuit diagram illustrating a structure of an OVP processing block according to another exemplary embodiment.

As shown in FIG. 6, the OVP processing block may be designed to operate on two levels.

In the exemplary embodiment of FIG. 6, an OVP processing block as shown in FIG. 4 and an OVP processing block as shown in FIG. 5 may be combined to constitute the OVP processing block of FIG. 6.

Referring to FIG. 6, OVP operations may be set and performed on two levels.

In more detail, an OVP operation is performed on a low level of the two levels to protect a circuit if an LED is opened as shown in FIG. 5.

In other words, if an OVP signal on which diode OR-ING has been performed is higher than or equal to a preset voltage threshold value, an overvoltage channel is detected using first and second feedback currents FB1 and FB2 of channels sensed by current sensors and a reference current Iref, and then an OVP operation is performed with respect to the overvoltage channel.

An OVP operation is performed on a high level of the two levels so as to protect a whole part of a circuit as shown in FIG. 3.

In other words, a voltage higher than a first voltage threshold value set on a low level is set to a second voltage threshold value and applied to a high level so as to protect an overvoltage state which cannot be processed on the low level.

For example, if an LED is not opened but an impedance of the LED is excessively high, an output voltage continuously increases so that a feedback current FB tracks the reference current Iref. Thus, a current higher than a current threshold value of 0.8*Iref may be sensed at a time point when the OVP processing block operates. In this case, a circuit may continue its normal operation at an output voltage higher than a voltage at which the OVP processing block starts operating.

Since a good/poor state determination is difficult in this specific case, a secondary global protection level (the above-described high level) may be set to disable outputs of all channels.

The structure of the OVP processing block of FIG. 6 will now be described in more detail. A signal 610 on which diode OR-ING has been performed is simultaneously input into a higher OVP processing block 621 and a lower OVP processing block 622.

In this case, the higher and lower OVP processing blocks 621 and 622 may respectively include comparators (not shown) which compare the signal 610 with voltage threshold values which are differently set.

For example, the signal 610 is compared with a first voltage threshold value in the higher OVP processing block 621 and with a second voltage threshold value in the lower OVP processing block 622. Here, the first voltage threshold value may be set to be wider than the second voltage threshold value.

In other words, if the signal 610 is higher than the first voltage threshold value, the signal 610 is processed in the higher OVP processing block 621. If the signal 610 is lower than the first voltage threshold value and higher than the second voltage threshold value, the signal 610 is processed in the lower OVP processing block 622.

Signals are output from AND circuits 641 and 642 according to the same principle as signals output from the AND circuits 541 and 542 of FIG. 5.

The signals output from the AND circuits 641 and 642 and a signal output from the higher OVP processing block 621 go through OR operations in OR circuits 651 and 652 and are then output.

For example, if the signal output from the AND circuit 641 is a low signal, and the signal output from the higher OVP processing block 621 is a high signal, the OR circuit 651 outputs a high signal so as to perform an OVP operation. In other words, first and second PWMs PWM01 and PWM02 and first and second gates GATE1 and GATE2 are disabled by a value output from the OR circuit 651.

In other words, if an overvoltage state is sensed in the higher OVP processing block 621, an OVP operation is performed with respect to all channels regardless of levels of feedback currents FB1 and FB2.

In the present exemplary embodiment, gain of 0.8 is merely an exemplary embodiment and thus may have any value which is optimized according to the surrounding conditions.

In the above-described drawings, flows of signals indicated with dotted lines are merely pluses of the major signal flows. Actually, the signals may pass any processing blocks which are not shown in the drawings or any processing blocks which are combined with other signals, or may be split into some processing blocks.

Also, in the above-described drawings, two channels have been described with an example of an IC which can control a boost circuit type LED driving circuit. However, this is merely an exemplary embodiment, and thus the present inventive concept may be applied to a circuit which includes three or more channels.

The present inventive concept may be applied to any type circuit which is not a boost type circuit.

Figure 7:
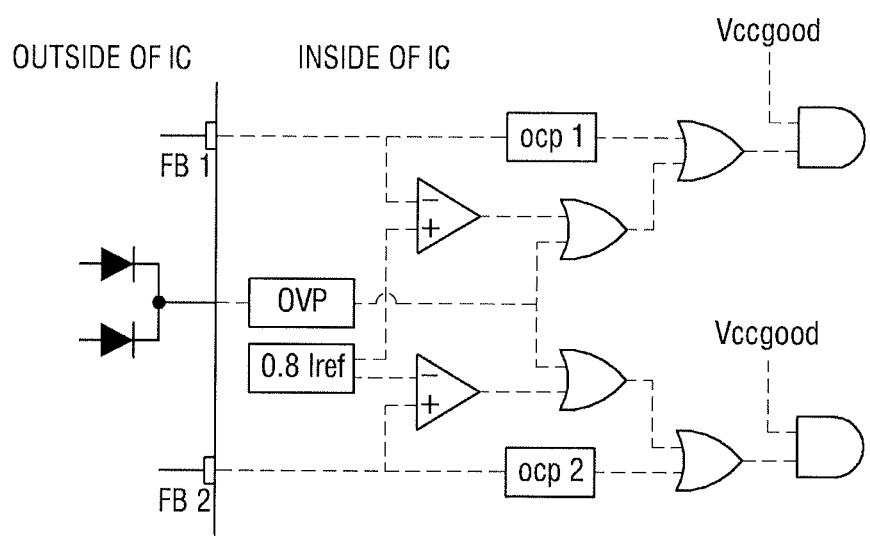
FIG. 7 is a circuit diagram illustrating an LED driving IC employing the OVP processing block of FIG. 5, according to an exemplary embodiment.

FIG. 7 is a circuit diagram illustrating an LED driving IC employing the OVP processing block 520 of FIG. 5, according to an exemplary embodiment.

Referring to FIG. 7, values are output from AND circuits 541 and 542 of FIG. 7 according to the same principle as the signals output from the AND circuits 541 and 542 of FIG. 5, and thus detailed descriptions of this will be omitted herein.

The values output from the AND circuits 541 and 542 and OCP values OCP1 and OCP2 of channels go through OR operations in OR circuits 551 and 552 and are then output.

In the present exemplary embodiment, the OVP processing block 520 of FIG. 5 is applied to the LED driving IC. However, the OVP processing block of FIG. 6 may be applied to the LED driving IC according to the same principle, and thus detailed descriptions of this will be omitted herein.

Figure 8:
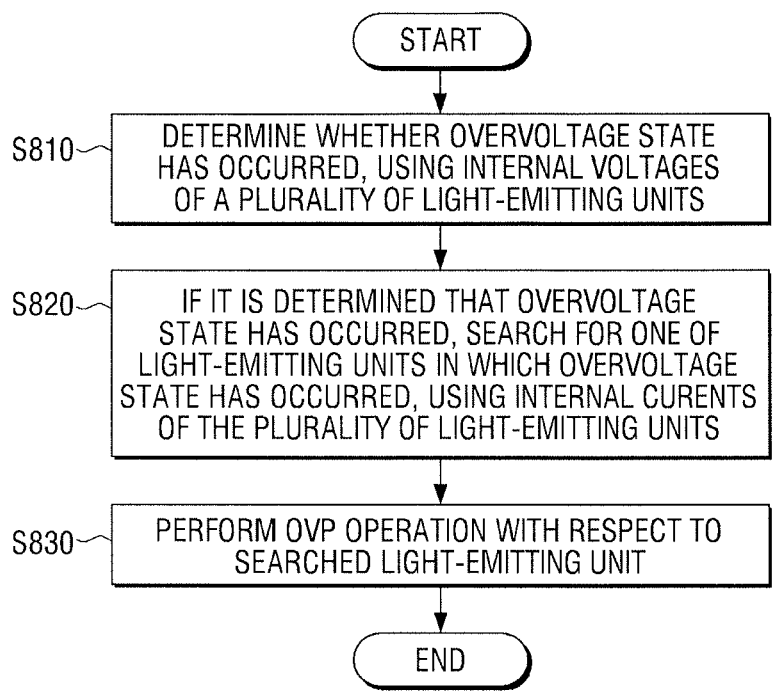
FIG. 8 is a flowchart illustrating a luminescence driving method according to an exemplary embodiment.

FIG. 8 is a flowchart illustrating a luminescence driving method according to an exemplary embodiment.

Referring to FIG. 8, the luminescence driving method is to drive a plurality of light-emitting units and includes determining whether an overvoltage state has occurred, using internal voltages of the plurality of light-emitting units (operation S810).

If it is determined that the overvoltage state has occurred (operation S810), one of the plurality of light-emitting units in which the overvoltage state has occurred is searched, using internal currents of the plurality of light-emitting units (operation S820). Here, the plurality of light-emitting units may be respectively realized as LED arrays which are arranged at an edge part of a BLU.

An OVP operation is performed with respect to the searched light-emitting unit (operation S830). Here, the OVP operation may be an operation of switching off a switch which is connected to the light-emitting units to apply power to the light-emitting units.

The determination whether the overvoltage state has occurred (operation S810) may include: sensing the internal voltages from the plurality of light-emitting units; performing diode OR-ING with respect the sensed internal voltages to generate an overvoltage sensing signal; and if the overvoltage sensing signal is higher than or equal to a preset first threshold value, determining that the overvoltage state has occurred.

The determination whether the overvoltage state has occurred (operation S810) may further include: if the overvoltage sensing signal is higher than or equal to a preset second threshold value, performing an OVP operation with respect to all of the plurality of light-emitting units.

Figure 9:
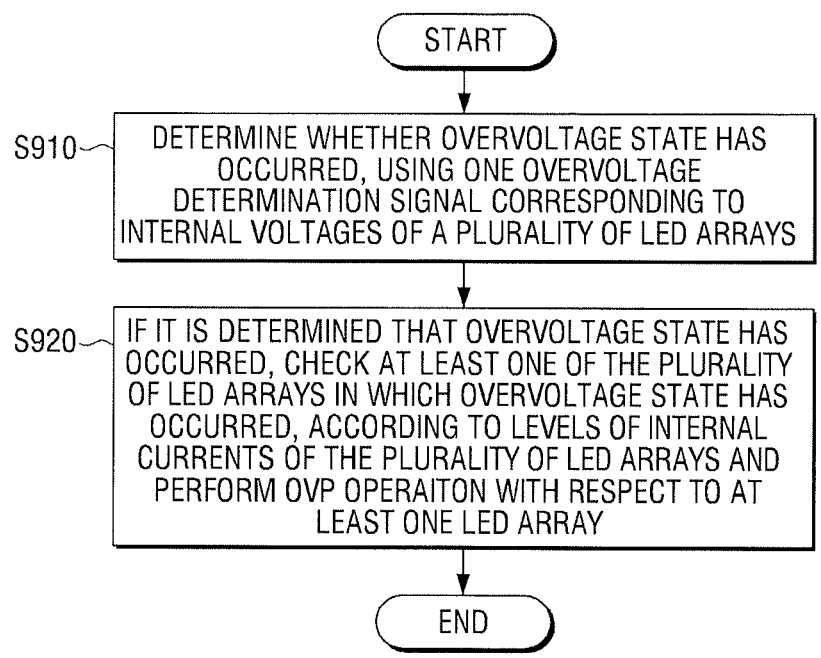
FIG. 9 is a flowchart illustrating a method of driving a display apparatus according to an exemplary embodiment.

FIG. 9 is a flowchart illustrating a method of driving a display apparatus according to an exemplary embodiment.

The method of driving the display apparatus including a plurality of LED arrays includes: determining whether an overvoltage state has occurred, using an overvoltage determination signal corresponding to internal voltages of the plurality of LED arrays (operation S910).

If it is determined that the overvoltage state has occurred (operation S910), at least one of the plurality of LED arrays in which the overvoltage state has occurred is checked according to levels of internal currents of the plurality of LED arrays, and an OVP operation is performed with respect to the least one LED array (operation S920).

The determination whether the overvoltage state has occurred (operation S910) may include: sensing the internal voltages of the plurality of LED arrays; performing diode R-ING with respect to the sensed internal voltages to generate an overvoltage determination signal; and if the overvoltage determination signal is higher than or equal to a preset first threshold value, determining that the overvoltage state has occurred.

If the overvoltage determination signal is higher than or equal to a preset second threshold value, an OVP operation may be performed with respect to all of the plurality of LED arrays.

The performance of the OVP operation (operation S920) may include: sensing the internal currents from the plurality of LED arrays; comparing the levels of the sensed internal currents with a reference current; determining one of the plurality of LED array from which the internal current having the level less than the reference current has been sensed, as the at least one LED array in which the overvoltage state has occurred; and performing an OVP operation with the at least one LED array.

The display apparatus may be a 3D image display apparatus which includes an edge-lit type LED BLU.

The plurality of LED arrays may be LED arrays which are arranged above and under the edge-lit type LED BLU.

Therefore, an output voltage OVP circuit of a driving IC may be further simplified in the driving IC of the edge-lit type LED BLU to reduce the number of IC pins and cost price.

A determination may be made as to whether an overvoltage state has occurred in which LED channel, using feedback currents of a plurality of LED arrays. Therefore, an OVP may be prevented from being applied to all of the plurality of LED arrays. Accordingly, although an LED is opened, a whole part of a screen is not gone out, thereby maintaining a minimum function of a display apparatus.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A luminescence driving apparatus which drives a plurality of light-emitting units, the luminescence driving apparatus comprising:
   a voltage sensor which senses internal voltages of the plurality of light-emitting units;
   a current sensor which senses internal currents of the plurality of light-emitting units;
   a sensing signal generator which receives the internal voltages of the plurality of light-emitting units from the voltage sensor and generates an overvoltage sensing signal;
   a controller which, if it is determined that an overvoltage state has occurred, according to a level of the overvoltage sensing signal, searches for at least one of the plurality of light-emitting units in which the overvoltage state has occurred, according to levels of the internal currents sensed by the current sensor; and
   a protector which performs an overvoltage protection (OVP) operation with respect to the searched light-emitting unit.

2. The luminescence driving apparatus as claimed in claim 1, wherein:
   the plurality of light-emitting units are light-emitting diode (LED) arrays which are arranged at an edge part of a backlight unit (BLU); and
   the sensing signal generator comprises at least one diode path which receives the internal voltages of the plurality of light-emitting units and performs diode OR-ING with respect to the internal voltages to output the overvoltage sensing signal.

3. The luminescence driving apparatus as claimed in claim 2, wherein if the overvoltage sensing signal is higher than or equal to a preset first threshold value, the controller determines that the overvoltage state has occurred, compares the levels of the internal currents sensed by the current sensor with a reference current, and determines one of the plurality of light-emitting units for which a sensed internal current has a level that is less than the reference current is the light-emitting unit in which the overvoltage state has occurred.

4. The luminescence driving apparatus as claimed in claim 3, wherein if the overvoltage sensing signal is higher than or equal to a preset second threshold value, the controller controls the protector to perform the OVP operation with respect to all of the plurality of light-emitting units.

5. The luminescence driving apparatus as claimed in claim 1, wherein the OVP operation is an operation of switching off a switch which is connected to the plurality of light-emitting units to apply power to the plurality of light-emitting units.

6. The luminescence driving apparatus as claimed in claim 1, wherein the luminescence driving apparatus is realized as a boost type integrated circuit (IC).

7. A display apparatus, comprising:
a plurality of light emitting diode (LED) arrays;
a voltage sensor which senses internal voltages of the plurality of LED arrays;
a current sensor which senses internal currents of the plurality of LED arrays; and
a controller which, if it is determined that an overvoltage state has occurred, using an overvoltage determination signal corresponding to the internal voltages sensed by the voltage sensor, checks at least one of the plurality of LED arrays in which the overvoltage state has occurred, according to levels of the internal currents sensed by the current sensor and performs an overvoltage protection (OVP) operation with respect to the at least one LED array.

8. The display apparatus as claimed in claim 7, wherein if the overvoltage determination signal is higher than or equal to a preset first threshold value, the controller determines that the overvoltage state has occurred, compares levels of the internal currents sensed by the current sensor with a reference current, determines one of the plurality of LED arrays for which a sensed internal current has a level that is less than the reference current is the at least one LED array in which the overvoltage state has occurred, and performs the OVP operation with respect to the at least one LED array.

9. The display apparatus as claimed in claim 8, wherein if the overvoltage determination signal is higher than or equal to a preset second threshold value, the controller performs an OVP operation with respect to all of the plurality of LED arrays.

10. The display apparatus as claimed in claim 7, wherein the display apparatus is a 3-dimensional (3D) image display apparatus which comprises an edge-lit type LED backlight unit (BLU).

11. A luminescence driving method of driving a plurality of light-emitting units, the luminescence driving method comprising:
determining whether an overvoltage state has occurred, using internal voltages of the plurality of light-emitting units;
if it is determined that the overvoltage state has occurred, searching for one of the plurality of light-emitting units in which the overvoltage state has occurred, using internal currents of the plurality of light-emitting units; and
performing an OVP operation with respect to the searched light-emitting unit.

12. The luminescence driving method as claimed in claim 11, wherein the determination whether the overvoltage state has occurred comprises:
sensing the internal voltages from the plurality of light-emitting units;
performing diode OR-ING with respect to the sensed internal voltages to generate an overvoltage sensing signal; and
if the overvoltage sensing signal is higher than or equal to a preset first threshold value, determining that the overvoltage state has occurred.

13. The luminescence driving method as claimed in claim 12, further comprising: if the overvoltage sensing signal is higher than or equal to a preset second threshold value, performing the OVP operation with respect to all of the plurality of light-emitting units.

14. The luminescence driving method as claimed in claim 11, wherein the plurality of light-emitting units are LED arrays which are arranged at an edge part of a BLU.

15. The luminescence driving method as claimed in claim 11, wherein the OVP operation is an operation of switching off a switch which is connected to the plurality of light-emitting units to apply power to the plurality of light-emitting units.

16. A method of driving a display apparatus comprising a plurality of light emitting diodes (LED) arrays, the method comprising:
determining whether an overvoltage state has occurred, using an overvoltage determination signal corresponding to internal voltages of the plurality of LED arrays; and
if it is determined that the overvoltage state has occurred, checking at least one of the plurality of LED arrays in which the overvoltage state has occurred, according to levels of sensed internal currents of the plurality of LED arrays and performing an overvoltage protection (OVP) operation with respect to the at least one LED array.

17. The method as claimed in claim 16, wherein the determination whether the overvoltage state has occurred comprises:
sensing the internal voltages from the plurality of LED arrays;
performing diode OR-ING with respect to the sensed internal currents to generate the overvoltage determination signal; and
if the overvoltage determination signal is higher than or equal to a preset first threshold value, determining that the overvoltage state has occurred.

18. The method as claimed in claim 17, further comprising: if the overvoltage determination signal is higher than or equal to a preset second threshold value, performing the OVP operation with respect to all of the plurality of LED arrays.

19. The method as claimed in claim 17, wherein the performance of the OVP operation comprises:
sensing the internal currents from the plurality of LED arrays;
comparing levels of the sensed internal currents with a reference current; and
determining one of the plurality of LED arrays for which a sensed internal current has a level that is less than the reference current is the at least one LED array in which the overvoltage state has occurred and performing the OVP operation with respect to the at least one LED array.

20. The method as claimed in claim 16, wherein the display apparatus is a 3D image display apparatus which comprises an edge-lit type LED BLU.

* * * * *